3,140,316
MANUFACTURE OF DIAMINODIPHENYLETHER
Jack L. Towle, Cleveland, Ohio, assignor to The Harshaw Chemical Company, Cleveland, Ohio, a corporation of Ohio
No Drawing. Filed June 23, 1960, Ser. No. 38,114
1 Claim. (Cl. 260—580)

This invention relates to a method for the preparation of a diaminodiphenylether and more specifically to a higher yield preparation of diaminodiphenylether.

Diaminodiphenylether has found use in various formulations, such as, for instance, in the preparation of organic dyes and in the preparation of polymeric resins. Disazo dyes may be prepared by tetrazotizing diaminodiphenylether and coupling the tetrazo compound with various coupling agents. Polyurethans have been made from polyols and diisocyanates, the latter derived from diaminodiphenylether by conventional methods. The use of the ether, however, has been limited by the fact that it could only be prepared in low yields. The consequence of such low yield preparation was to limit the commercial aspects of diaminodiphenylether.

The best preparation of the prior art produces diaminodiphenylether in 45% yields and is a Williamson-type reaction carried out by the condensation of the sodium salt of p-nitrophenol and p-nitrochlorobenzene followed by the reduction of the nitro groups. The reaction is as follows:

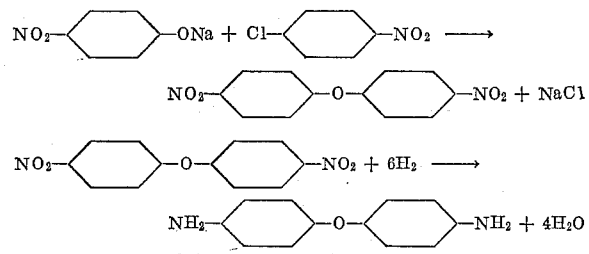

Because of the extremely low nucleophilic activity of the p-nitrophenoxide ion, this reaction invariably produces low yields. Maximum yield of 45% may be obtained by the Williamson-type reaction when a 6:1 molar ratio of chloro compound to the phenol is employed and reaction temperatures are kept in the range from 245° C. to 250° C. When the foregoing extreme conditions are not employed, the yield of diaminodiphenylether is generally 10% to 12%. The use of a great excess of chloronitrobenzene presents an additional problem in subsequent removal of the unreacted chloro compound.

It is, therefore, an object of this invention to prepare diaminodiphenylether by means of a high yield reaction.

It is another object of this invention to prepare diaminodiphenylether by means of a high yield reaction which does not require extensive purification procedures.

I have now discovered that it is possible to prepare diaminodiphenylether in high yields by means of nitrating diphenylether to dinitro and trinitro derivatives, reducing said dinitro and trinitro derivatives to the corresponding diamino and triamino derivatives, drowning said diamino and triamino derivatives in water and filtering out water insoluble diaminodiphenylether.

It should be noted that when diphenylether is nitrated a mixture is invariably produced. In addition to the isomers of the dinitro derivatives some mononitro, trinitro and possible traces of polynitro derivatives are also formed. If, however, controlled conditions are employed with sufficient nitric acid, no mononitro is formed and a mixture of dinitro, trinitro and possible traces of polynitro products result. For purposes of this invention, the controlled nitration conditions may be called over nitration (nitration to the point that no mononitro is formed).

The process is feasible because of the easy separation of diaminodiphenylether from tri- and polyamine derivatives through the solubility of the triamines and the polyamines in water. The diamine is very insoluble in water while the triamines and the polyamines are very soluble. Thus, if diphenylether is nitrated to the point that no water-insoluble monoamine is formed subsequent to reduction and the mixture of diamino, triamino and polyamino compounds drowned in an excess of water, the diamine can be filtered off and washed free of any by-products.

The properties of the foregoing amines which are of interest to the procedure of this invention are outlined in the following table:

| Compound— | H₂O Solubility |
|---|---|
| Monoaminodiphenylether | Insoluble. |
| Diaminodiphenylether | Insoluble. |
| Tri- and polyaminodiphenylether | Very soluble. |

In general, the nitration of the diphenylether is carried out with nitric acid although it should be understood that other nitrating agents may be employed. The solvent employed for the reaction may be a solvent such as, for instance, acetic acid and acetic anhydride. When acetic anhydride is employed as a solvent and nitric acid is employed as a nitrating agent, the mole ratio of nitric acid to diphenylether is from 3:1 to 8:1, the preferred ratio being 5.5:1. When acetic acid is employed as a solvent and nitric acid is employed as a nitrating agent, the mole ratio of nitric acid to diphenylether is about 8:1.

The reduction operation of this invention may be any reduction operation suitable for the reduction of an aromatic nitro compound to an aromatic amino compound. Two types of reduction operations which have been found to be especially suitable for purposes of this invention are catalytic reduction with hydrogen and Raney nickel catalyst and reduction with iron powder and acid.

The following specific examples are given for purposes of illustration and should not be considered as limiting the spirit and scope of this invention.

*Example I*

To a one-liter three-necked flask equipped with a thermometer, dropping funnel and mechanical stirrer was added 170 g. (1 mole) of diphenylether and 216 g. (2.12 moles) of acetic anhydride. Then to 216 g. (2.12 moles) of acetic anhydride cooled in an ice bath was added 346 g. (5.5 moles) of fuming nitric acid. The nitric acid mixture was added slowly (2 hours) at a temperature between 25° C.–30° C. to a well agitated solution of diphenylether in acetic anhydride. After approximately three-quarters of the nitric acid had been added, yellow crystals began to separate from the reaction mixture. Subsequent to addition of the nitric acid, the mixture was stirred for 3.5 hours at room temperature and then poured into excess water. The crystalline product was filtered off and washed thoroughly with water and dried. A yield of 274 g. was obtained.

The nitration product of diphenylether, obtained in the manner described was reduced as follows:

75 g. of nitration product was added to approximately 900 ml. of 95% ethanol contained in a reduction bottle. This was warmed on the water bath until the solid dissolved. Then 3 grams of Raney nickel were added and the bottle placed in the hydrogenation apparatus. Hydrogen was introduced to the bottle to a pressure of about 50 lbs. p.s.i. and the mixture shaken at room temperature until there was no further drop in pressure. The reduction bottle was disconnected and the contents filtered and washed with a small amount of 95% ethanol, and the washings added to the main filtrate. After most of the solvent had been removed by distillation under reduced pressure, the residue was drowned in an excess of ice and water and agitated. Dark brown crystals separated and were filtered off and washed with cold water. The crystals were redissolved in dilute HCl, treated with activated carbon, filtered and reprecipitated by the addition of dilute NH₄OH. The pink crystals were filtered, washed with water and dried at 50° C. The diaminodiphenylether so formed weighed 48.2 grams, representing a yield of 83.5%. An amino content determined with standard sodium nitrite was 15.85% (calculated 16.00%).

*Example II*

To a one-liter three-necked flask equipped with a thermometer, dropping funnel and mechanical stirrer was added 170 g. (1 mole) of diphenylether and 216 g. (2.12 moles) of acetic anhydride. Then to 216 g. (2.12 moles) of acetic anhydride cooled in an ice bath was added 346 g. (5.5 moles) of fuming nitric acid. The nitric acid mixture was added slowly (2 hours) at a temperature between 25° C.–30° C. to the well agitated solution of diphenylether in acetic anhydride. After approximately three-quarters of the nitric acid had been added, yellow crystals began to separate from the reaction mixture. Subsequent to addition of the nitric acid, the mixture was stirred for 3.5 hours at room temperature and then poured into excess water. The crystalline product was filtered off and washed thoroughly with water and dried. A yield of 274 g. was obtained.

The nitration product of diphenylether, obtained in the manner described, was reduced as follows:

To a three-liter, three-neck flask equipped with agitator, thermometer and reflux condenser was added 300 ml. of 50% ethanol, 255 g. of iron filings and 22.4 ml. of concentrated HCl. The mixture was brought to reflux temperature and then with good agitation, a total of 195 g. of nitration product was added in small portions over a period of one hour. After each addition, the reaction becomes very exothermic and external heating is removed until reaction subsides. When the addition has been completed, the mixture is refluxed for 2 hours. It is then made alkaline with caustic, and filtered hot through a steam heated funnel. The filtrate is cooled and added to an excess of ice and water and agitated until precipitation is completed. The filtered product is redissolved in dilute HCl, treated with activated carbon, filtered and the filtrate cooled by the addition of ice. The product was reprecipitated with dilute NH₄OH with cooling and agitation. It was filtered off, washed with cold water and dried at 50° C. The weight was 120 g. representing a yield of 80%. The amino content determined by nitrite titration was 16.10% (calculated 16.00%).

The product of the novel preparation of this invention is always a mixture if isomers of diaminodiphenylether which may be written as follows:

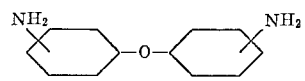

The mixture of isomers are due to the mixture of dinitro isomers which are obtained prior to reduction operations.

Having thus disclosed my invention, what I claim is:

A process for the preparation of diaminodiphenyl ether including the steps of (1) contacting, with agitation, in solution in acetic anhydride, diphenyl ether and from 3 to 8 moles of fuming nitric acid for each mole of diphenyl ether whereby to produce a mixture of dinitrodiphenyl ether and trinitrodiphenyl ether containing traces of higher polynitrodiphenyl ethers and substantially free from mononitrodiphenyl ether (2) adding the reaction mixture to water to precipitate the mixture of nitration products (3) reducing the nitro groups to amino groups (4) separating the resulting diaminodiphenyl ether from the triamino and higher polyamino diphenyl ethers by adding the mixture to water and (5) removing the insoluble diamino diphenyl ether from the soluble tri and higher polyamino diphenyl ethers, leaving the diamino diphenyl ether substantially pure and free from monoamino diphenyl ether, and triamino and higher polyamino phenyl amines.

References Cited in the file of this patent

UNITED STATES PATENTS

| | | |
|---|---|---|
| 1,574,337 | Bogert | Feb. 23, 1926 |
| 1,703,915 | Zitscher | Mar. 5, 1929 |
| 1,877,302 | Grether | Sept. 13, 1932 |
| 2,400,287 | Caesar | May 14, 1946 |
| 2,454,468 | McArdle | Nov. 23, 1948 |
| 2,765,341 | Wirth et al. | Oct. 2, 1956 |

FOREIGN PATENTS

| | | |
|---|---|---|
| 912,931 | Germany | June 3, 1954 |